US008851487B2

(12) United States Patent
Maxie

(10) Patent No.: US 8,851,487 B2
(45) Date of Patent: Oct. 7, 2014

(54) INFANT TRANSPORT APPARATUS AND METHOD

(71) Applicant: Ernestine P. Maxie, Chicago Heights, IL (US)

(72) Inventor: Ernestine P. Maxie, Chicago Heights, IL (US)

(*) Notice: Subject to any disclaimer, the term of this patent is extended or adjusted under 35 U.S.C. 154(b) by 0 days.

(21) Appl. No.: 14/204,269

(22) Filed: Mar. 11, 2014

(65) Prior Publication Data
US 2014/0252737 A1 Sep. 11, 2014

Related U.S. Application Data

(60) Provisional application No. 61/775,998, filed on Mar. 11, 2013.

(51) Int. Cl.
*B62B 7/06* (2006.01)
*A47D 13/02* (2006.01)

(52) U.S. Cl.
CPC ............ *B62B 7/06* (2013.01); *A47D 13/025* (2013.01)
USPC .................................. 280/47.38; 280/87.051

(58) Field of Classification Search
CPC ... A47D 13/043; A47D 13/04; A47D 13/046; A47D 13/107; A47D 13/02; A61H 3/04; A61H 3/08; A61H 2201/1633; A61H 2201/0161; B62B 5/082; B62B 5/087
USPC .......................................... 280/87.051, 47.38
See application file for complete search history.

(56) References Cited

U.S. PATENT DOCUMENTS

| 2,606,593 | A | * | 8/1952 | Beurskens | 280/7.1 |
| 2,657,735 | A | * | 11/1953 | Hughes | 297/5 |
| 3,493,976 | A | | 2/1970 | Baker | |
| 3,504,927 | A | * | 4/1970 | Seki | 280/87.05 |
| 3,619,823 | A | | 11/1971 | Sackett | |
| 3,984,115 | A | | 10/1976 | Miller | |
| 4,248,478 | A | | 2/1981 | Aron | |
| 4,362,333 | A | | 12/1982 | Cohen | |
| 5,242,212 | A | * | 9/1993 | Polley | 297/464 |

(Continued)

OTHER PUBLICATIONS

"Bucket Baby"; Jan. 24, 2013; http://web.archive.org/web/20130127015720/http://whitetrashrepairs.com/white-trash-bucket-baby.*

*Primary Examiner* — Katy M Ebner
*Assistant Examiner* — Emma K Frick
(74) *Attorney, Agent, or Firm* — Meroni & Meroni, P.C.; Charles F. Meroni, Jr.; Christopher J. Scott

(57) ABSTRACT

An infant transport apparatus includes a Bucket assembly, an Insert assembly, and a Ring assembly (i.e. a BIR arrangement). The bucket assembly includes a bucket construction and a handle assembly. The bucket construction includes two bucket-based, leg-receiving apertures adjacent the bucket bottom. The inner bucket surface defines a volumetric space for receiving an infant. The insert assembly includes a liner assembly and a harness assembly. The liner assembly is sized and shaped to fit the inner bucket surface. The harness assembly is removably attached to the bucket assembly and donnable by the infant. The ring assembly includes an upper ring assembly. The bucket assembly is received and supported by the upper ring assembly such that the bucket-based and certain mesh-based leg-receiving apertures of the upper ring assembly are aligned. The bucket assembly is selectively removable from the mesh sack for transporting the infant.

18 Claims, 9 Drawing Sheets

(56) References Cited

U.S. PATENT DOCUMENTS

| | | | |
|---|---|---|---|
| 5,458,550 A * | 10/1995 | Braim et al. .................... 482/69 |
| D386,559 S | 11/1997 | Belderok-Burghouts |
| 5,813,720 A * | 9/1998 | Huang .............................. 297/5 |
| 5,921,567 A * | 7/1999 | Brown ..................... 280/87.051 |
| 6,012,731 A * | 1/2000 | Liu ........................... 280/87.051 |
| 6,158,065 A | 12/2000 | Tuoriniemi et al. |
| 6,988,644 B1 | 1/2006 | Asherbranner |
| 7,389,897 B2 | 6/2008 | Pistiolis et al. |
| 7,472,964 B2 | 1/2009 | King |
| 7,661,566 B2 | 2/2010 | Yoshie et al. |
| 8,028,871 B2 | 10/2011 | Gray |
| 2002/0164917 A1 * | 11/2002 | Keegan et al. .................. 446/71 |
| 2011/0088158 A1 | 4/2011 | Cerasani |
| 2013/0056945 A1 * | 3/2013 | Huang .................... 280/87.051 |

* cited by examiner

INFANT TRANSPORT APPARATUS AND METHOD

PRIOR HISTORY

This non-provisional patent application claims the benefit of U.S. Provisional Patent Application No. 61/775,998 filed in the United States Patent and Trademark Office on 11 Mar. 2013.

BACKGROUND OF THE INVENTION

1. Field of the Invention

The present invention relates generally to an apparatus for transporting or carrying an infant. More particularly, the present invention relates to a low cost assembly and method for carrying or transporting an infant or small child along with other items an infant may find useful.

2. Brief Description of the Prior Art

Certain prior art generally related to the subject invention are briefly described hereinafter. U.S. Pat. No. 3,493,976 ('976 patent), which issued to Baker, for example, discloses a Baby Bath and Play Tub. The '976 patent describes a bucket-like bath and play tub having a seat, a back support, side walls with shoulder support regions, a foot well, and water level control means all of which are cooperatively formed to minimize the danger of toppling.

U.S. Pat. No. 3,619,823 ('823 patent), which issued to Sackett, discloses a Baby Shower-Bath and Play Tub. The '823 patent describes a shower-bath and play tub having a seat mounted to swivel within the tub, the seat having a configuration to prevent a baby from toppling, and an overhead water dispenser and depending handle element to enable its selective activation and play by a bathing and showering baby. Notably, the tub comprises a bucket-like seat as at 13. The seat 13 comprises apertures 35 for receiving the infant's legs United States Published Patent Application No. 2011/0088158 was authored by Cerasani, and describes a Baby Bucket as a one single plastic extrusion poured product. The upright shape and the specially contoured smooth internal surface of the Baby Bucket simulate the shape and inside of a mother's womb and enable a baby to take a fetal position; therefore, the Baby Bucket gives a baby a natural and stress free bathing experience. Furthermore, the upright position reduces the chance of a baby swallowing water and/or drowning in water like in a conventional flat bath tub.

International Patent Application No. PCT/US1994/008424, which was authored by Strassburger, describes a Baby Bathtub. Strassburger's baby bathtub enables infants to bathe in an essentially upright position. The baby can be substantially submerged in water, and is not confined by the bathtub. The bathtub may be configure for use in a sink and includes a fluid-tight container and a support means positioned within the container. The support means may consist of a platform which is configured to anatomically conform to the baby's body.

It will be seen from a review of the foregoing in particular, and the field of infant transport means in general that the prior art perceives a need for an infant transport apparatus comprising a bucket assembly, a bucket-insert assembly, and a collapsible ring assembly whereby the bucket-insert assembly is received in the bucket assembly, and the bucket assembly is received in the ring assembly. Accordingly, the present invention provides an infant transport apparatus of the foregoing type as summarized in more detail hereinafter.

SUMMARY OF THE INVENTION

The present invention essentially provides an infant transport apparatus for transporting an infant or small child from one location to another. To achieve this basic function the infant transport apparatus according to the present invention preferably comprises, in combination: a bucket assembly; a (bucket) insert assembly, and a bucket-support or ring assembly.

The bucket assembly according to the present invention is believed to be the primary basic component to the present invention. The bucket assembly preferably comprises a bucket construction and a handle assembly. The bucket construction preferably comprises an open bucket top, a closed bucket bottom, an apertured bucket wall, an outer bucket surface, and an inner bucket surface.

The closed bucket bottom preferably has a lower outer bucket diameter. The apertured bucket wall preferably comprises two bucket-based, leg-receiving apertures adjacent the closed bucket bottom. The inner bucket surface defines a volumetric space sufficiently sized for receiving an infant or small child. The handle assembly preferably comprises an open bucket top traversing member and a handle portion.

The insert assembly preferably comprises a liner assembly and a harness assembly. The liner assembly is preferably sized and shaped to fit the inner bucket surface. The harness assembly is preferably removably and separately attachable to the bucket assembly and the liner assembly and donnable over the shoulders of an infant or small child for preventing inadvertent removal of the infant or small child from the bucket assembly when received in the volumetric space.

The liner assembly preferably comprises a padded material construction for interfacing between the bucket-received infant or small child and the bucket assembly. In other words, the padded material construction of the liner assembly shields the bucket-received infant or small child from direct contact with the inner bucket surface. In this regard, the reader will further please note that the two bucket-based, leg-receiving apertures are preferably outfitted with aperture rim lining structures. The aperture rim lining structures also shield the infant's or small child's legs from directly contacting the apertured bucket wall.

The liner assembly further preferably comprises an outer bucket flap that extends through the open bucket top and is folded over the apertured bucket wall so as to extend downwardly in circumferential adjacency to the outer bucket surface. The outer bucket flap comprises handle receiving slots to accommodate the member open bucket top traversing member. The liner assembly further preferably comprises liner-based leg receiving apertures. In inferior adjacency to the leg-receiving apertures are two liner extensions that extend through the leg-receiving apertures when the liner assembly is received in the bucket assembly.

The apertured bucket wall preferably comprises posterior-located, opposed, bucket-based, strap-receiving slots and the liner assembly preferably comprises posterior-located, opposed, liner-based strap-receiving slots. The slots align with the slots when the liner assembly is inserted into the bucket assembly.

The harness assembly preferably opposed harness-to-bucket fastening straps, which harness-to-bucket fastening straps extend through the strap-receiving slots. The harness-to-bucket fastening straps preferably comprise matable hook and look type fastening means. The matable fastening means removably fasten the opposed harness-to-bucket fastening straps thereby fastening the harness assembly to the bucket construction.

The harness assembly further preferably comprises over-the-shoulder harness members that fasten to extensions of the harness straps that fasten the harness to the bucket assembly. These extensions may be preferably outfitted with certain first fastening means as exemplified by buttons. In this regard, the over-the-shoulder harness members are preferably outfitted with matable at least second fastening means that mate with the first fastening means. Each over-the-shoulder member may further preferably comprise more than one second fastening means for enabling the user to adjust the length of the over-the-shoulder member relative to the strap extensions.

The ring assembly preferably comprises an upper ring assembly, an intermediate or middle ring (assembly), and a lower ring assembly. The upper ring assembly preferably comprises a first ring and an apertured mesh sack. The first ring preferably comprises a first ring diameter. The apertured mesh sack is attached to the first ring via a series of sack-to-ring loops or straps and preferably comprises two sack-based leg receiving apertures. The lower outer bucket diameter is preferably lesser than the first ring diameter.

The bucket assembly is preferably receivable by the first ring and supportable by the apertured mesh sack such that the bucket-based apertures, liner-based apertures, and sack-based leg-receiving apertures are aligned. The lower ring assembly preferably comprises a second ring and a mesh support structure. The second ring has a second ring diameter. The mesh support structure basically functions to support objects placed thereupon. The second ring may be preferably outfitted with a rubberized outer coating for preventing damage to structures the second ring may contact. The second ring diameter is greater than the first ring diameter.

The ring assembly further preferably comprises a third ring assembly, which third ring assembly preferably comprises a third ring. The third or intermediate ring has a third ring diameter. The third ring diameter is preferably lesser than the second ring diameter and greater than the first ring diameter. Noting the respectively varied diameters of the rings, the ring assembly is preferably collapsible.

In this regard, it is contemplated that each of the rings are connected via a series of structural members that may comprise a pivot axis, which pivot axes are prevented from inadvertent rotation by manually displaceable locking sleeves. To collapse the ring assembly, the locking sleeves are manually displaced thereby enabling rotation of the structural members so as to collapse the rings in a manner that is diametrically nestable for enhancing a user's ability to transport the ring assembly when the bucket assembly and insert assembly are removed therefrom.

The lower ring assembly may further preferably comprise a series of circumferentially spaced casters for exemplifying certain roller means for movement. The roller means for movement are believed to enhance the transportability of the infant transport apparatus. Further, the lower ring assembly may further preferably comprise a second layer of material, which material layer is separated from mesh support structure for enabling a user to extend a user's arm therethrough for carrying the collapsed ring assembly.

The bucket assembly is selectively removable from the apertured mesh sack for manually transporting a bucket-contained infant or small child via the handle assembly. The ring assembly may then be collapsed and further carried by the user. In addition to the various structural aspects of the invention, however, it is believed that the foregoing specifications further support certain infant transport methodological advancements or certain methods for transporting an infant or small child.

Accordingly, the infant transport method supported by the apparatus according to the present invention is believed to essentially comprise the initial step of providing a bucket assembly, the bucket assembly comprising a bucket construction and a handle assembly. The bucket construction comprises an open bucket top, an apertured bucket bottom, and an inner bucket surface. The apertured bucket bottom comprises two bucket-based, leg-receiving apertures, and the inner bucket surface defines a volumetric space for receiving an infant or small child.

The infant transport method may be further said to comprise the steps of inserting a select infant or small child into the volumetric space; extending the select infant's or small child's legs through the bucket-based leg-receiving apertures; and transporting the select infant or small child as received with the volumetric space via the handle assembly.

The infant transport method may be said to comprise the further steps of outfitting the bucket assembly with an insert assembly before inserting the select infant or small child into the volumetric space. The insert assembly may preferably comprise a liner assembly sized and shaped to fit the inner bucket surface, which liner assembly shields the select infant or small child from direct contact with the inner bucket surface during transport.

The infant transport method may be said to preferably comprise the step of donning a harness assembly upon the select infant or small child, the harness assembly being removably attached to the bucket assembly for preventing inadvertent removal of the infant or small child from the bucket assembly during transport.

The infant transport method may be said to preferably comprise the step of providing a bucket-support assembly as exemplified by the ring assembly substantially as described hereinabove. It will be recalled that the bucket support assembly preferably comprises an upper ring assembly, which upper ring assembly comprises a first ring and certain apertured means for receiving and supporting the bucket assembly, which apertured means are cooperable with the leg-receiving apertures formed in the bucket assembly, which is received and supported by the apertured means.

The infant transport method may be said to preferably further comprise the steps of removing the bucket assembly from the bucket support assembly; and collapsing the bucket support assembly. Further, the infant transport method of claim may well embrace a bucket support assembly comprising certain roller means for movement, which roller means for movement enhance the transportability of the bucket support assembly with or without the bucket assembly supported thereby.

It is further contemplated, for example, that the infant transport apparatus according to the present invention could be used in combination with an umbrella type structure for shielding the bucket-received infant or small child from the weather and/or elements. Accordingly, although the present invention has been described by reference to certain preferred arrangements and certain methodologies, it is not intended that the novel arrangements and methods be limited thereby, but that modifications thereof are intended to be included as falling within the broad scope and spirit of the foregoing disclosures, the following claims, and the appended drawings.

BRIEF DESCRIPTION OF THE DRAWINGS

Other features of my invention will become more evident from a consideration of the following brief descriptions of illustrations of the subject invention:

FIG. 1A is a enlarged, fragmentary diagrammatic depiction of a pivotal junction site of a ring support member according to the present invention.

DETAILED DESCRIPTION OF THE PREFERRED EMBODIMENT AND METHODOLOGY

Figure 1:
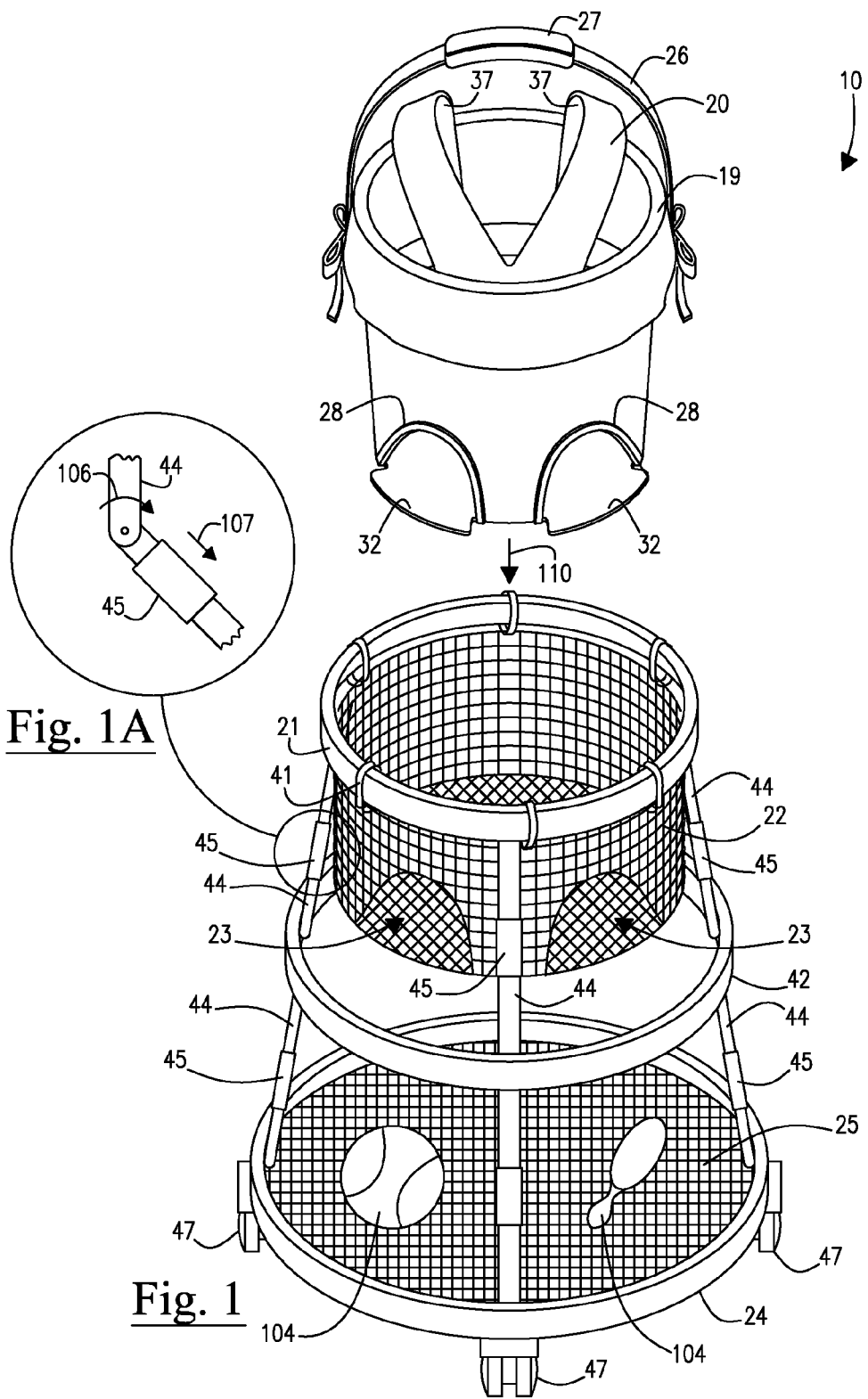
FIG. 1 is a top partially exploded perspective view of an infant transport apparatus according to the present invention showing an assembled bucket assembly and bucket-insert assembly exploded from a collapsible ring assembly.
Figure 2:
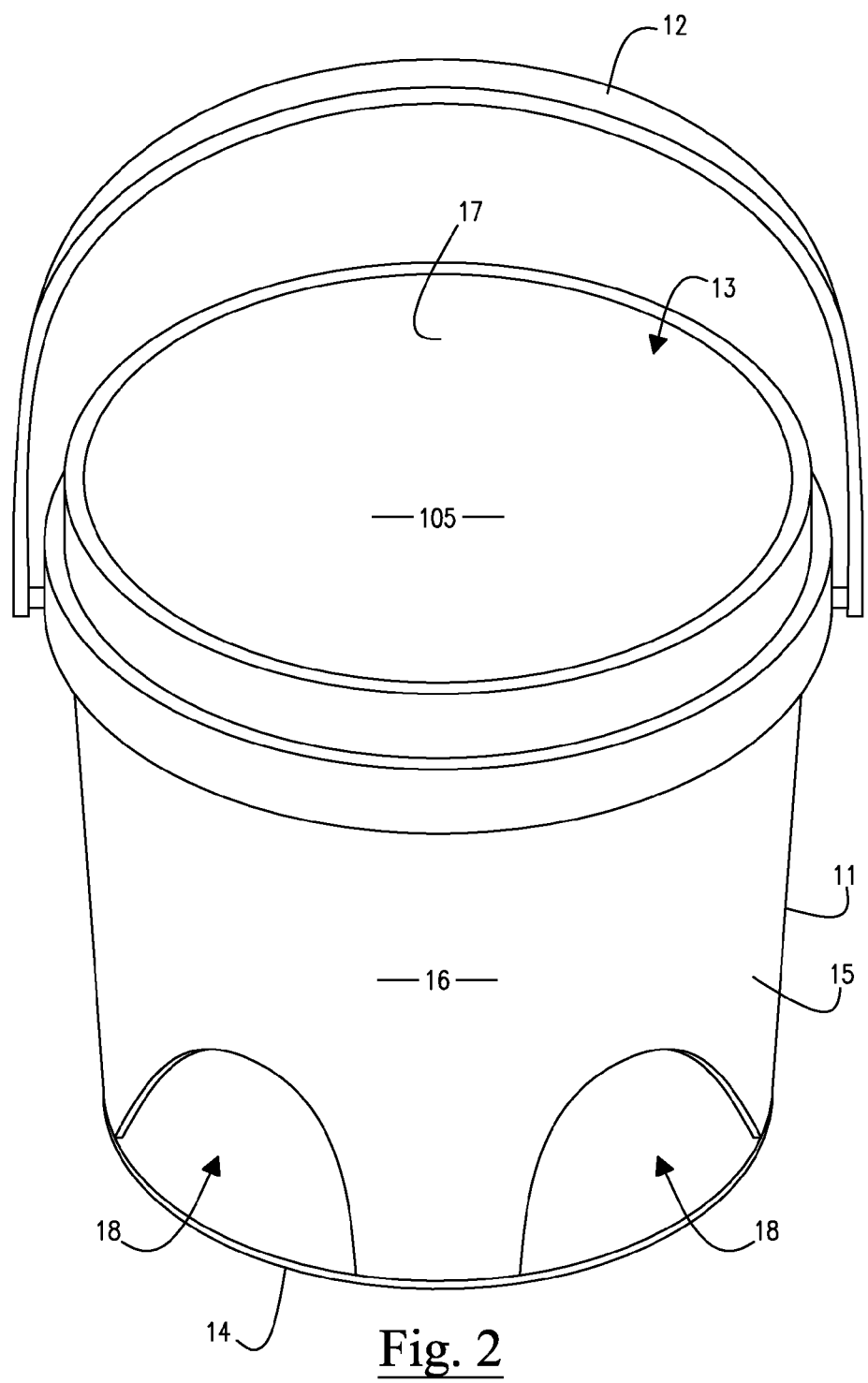
FIG. 2 is a top perspective view of a bucket assembly according to the present invention.
Figure 3:
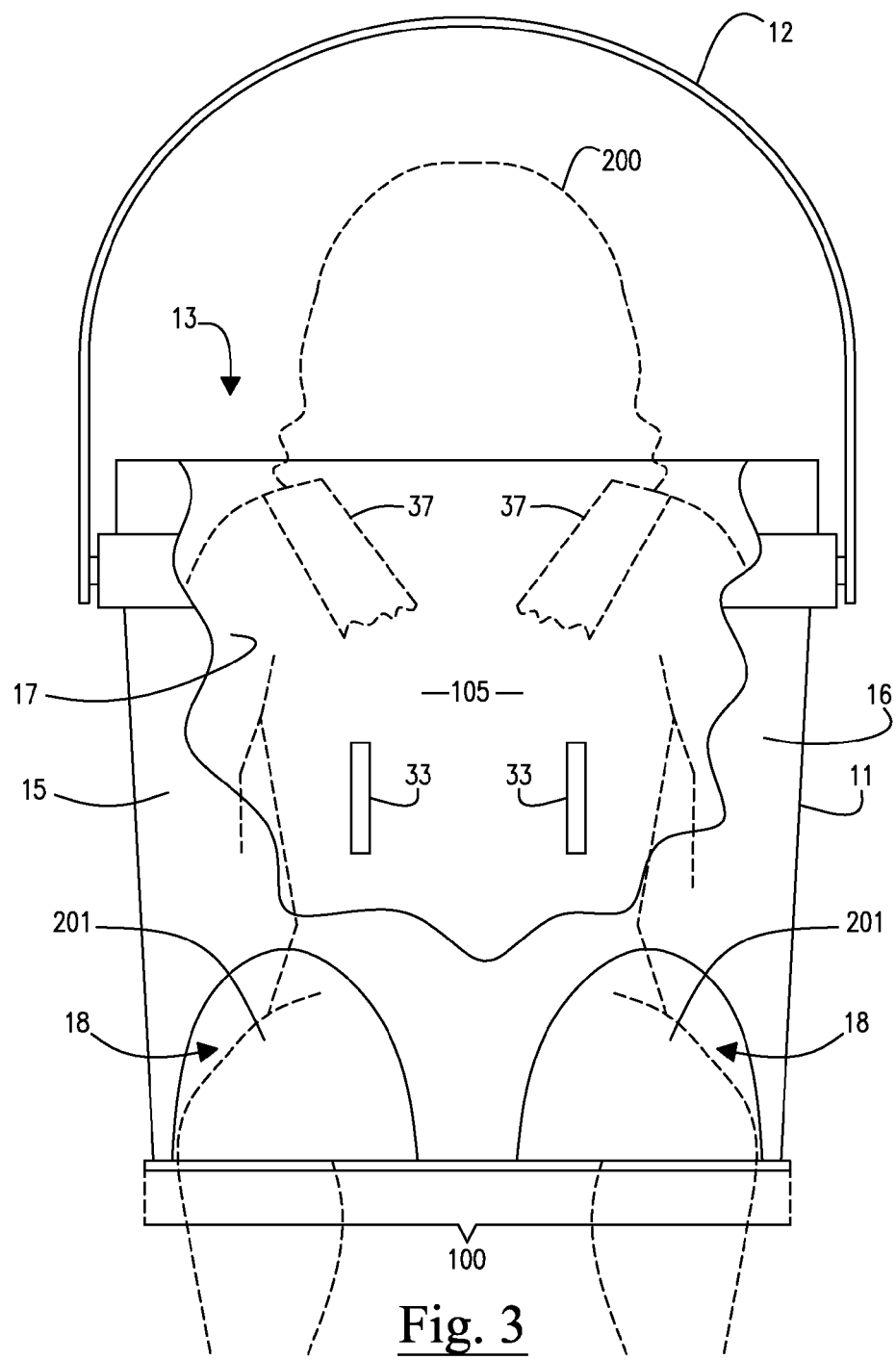
FIG. 3 is an anterior or frontal elevational view of a bucket assembly according to the present invention with parts broken away to show an inner volumetric space for receiving an infant or small child shown in phantom with a donned fragmentary harness assembly.
Figure 4:
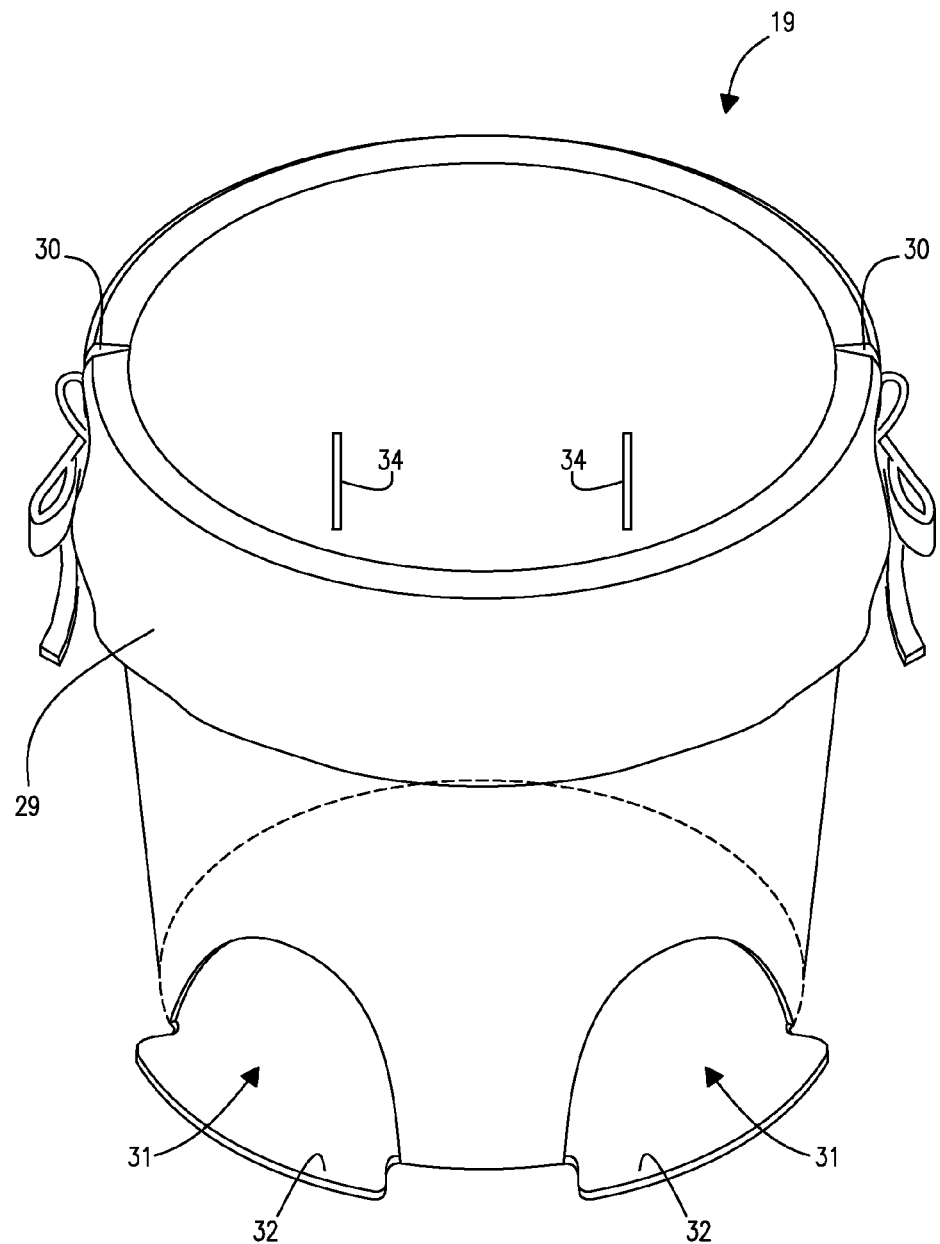
FIG. 4 is a top perspective view of a bucket insert assembly according to the present invention.
Figure 5:
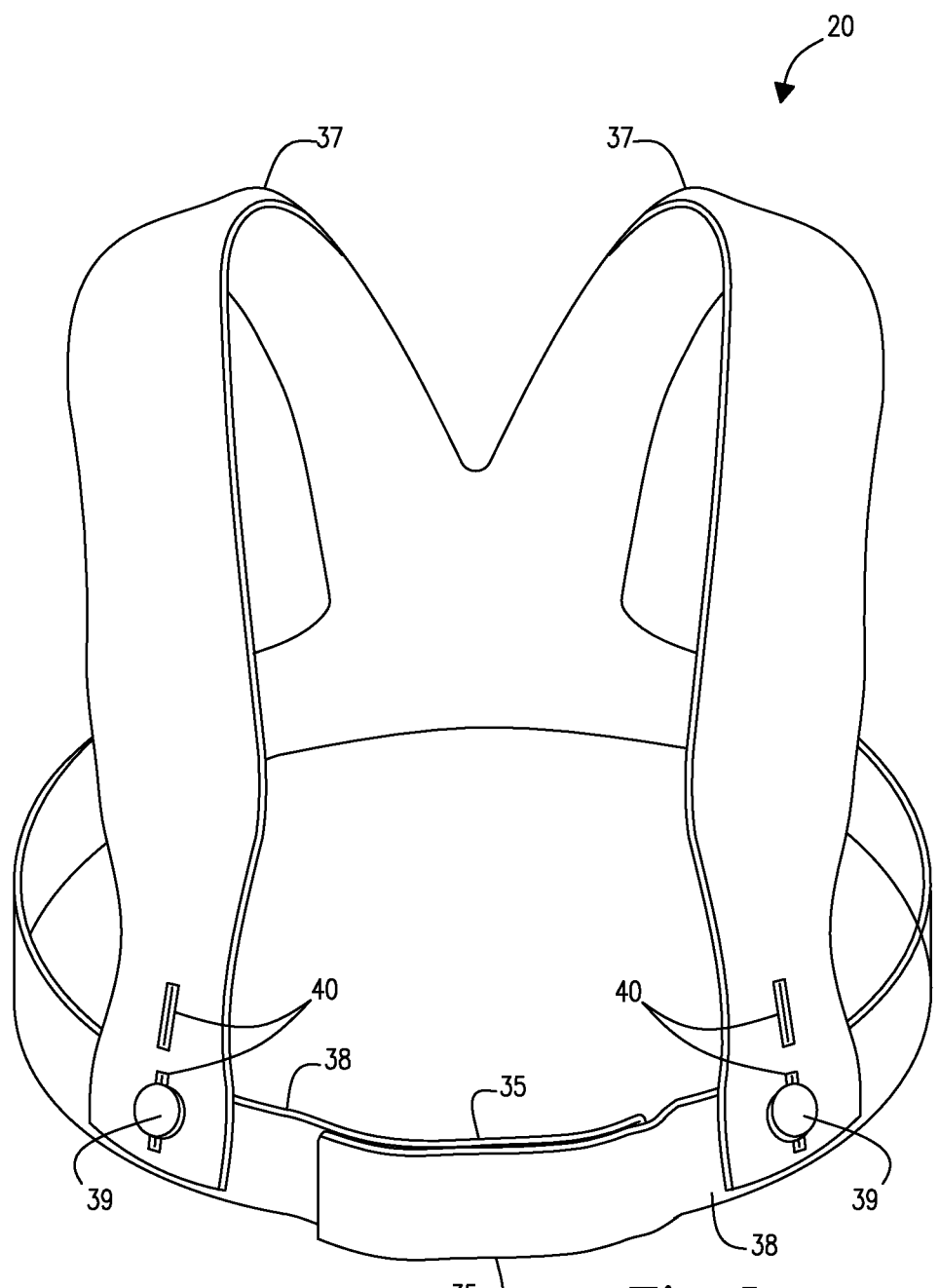
FIG. 5 is a top posterior or rear perspective view of an inside out harness assembly according to the present invention, the harness assembly being shown inside out to more clearly show harness adjusting buttons.
Figure 6:
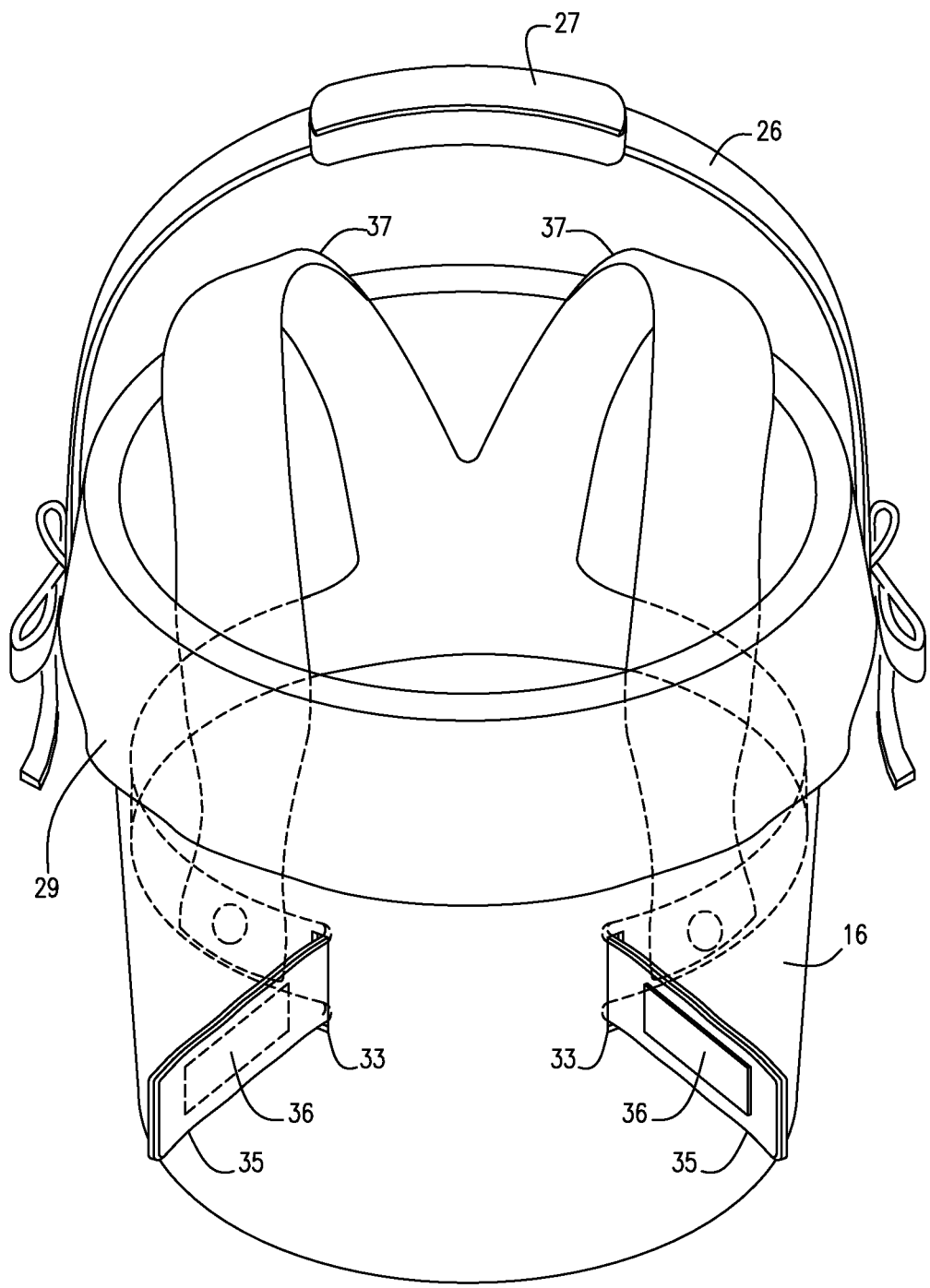
FIG. 6 is a first sequential top posterior or rear perspective view of the bucket and bucket insert assemblies showing certain straps of the harness assembly extending through posterior slots formed in the bucket insert and bucket assemblies.
Figure 7:
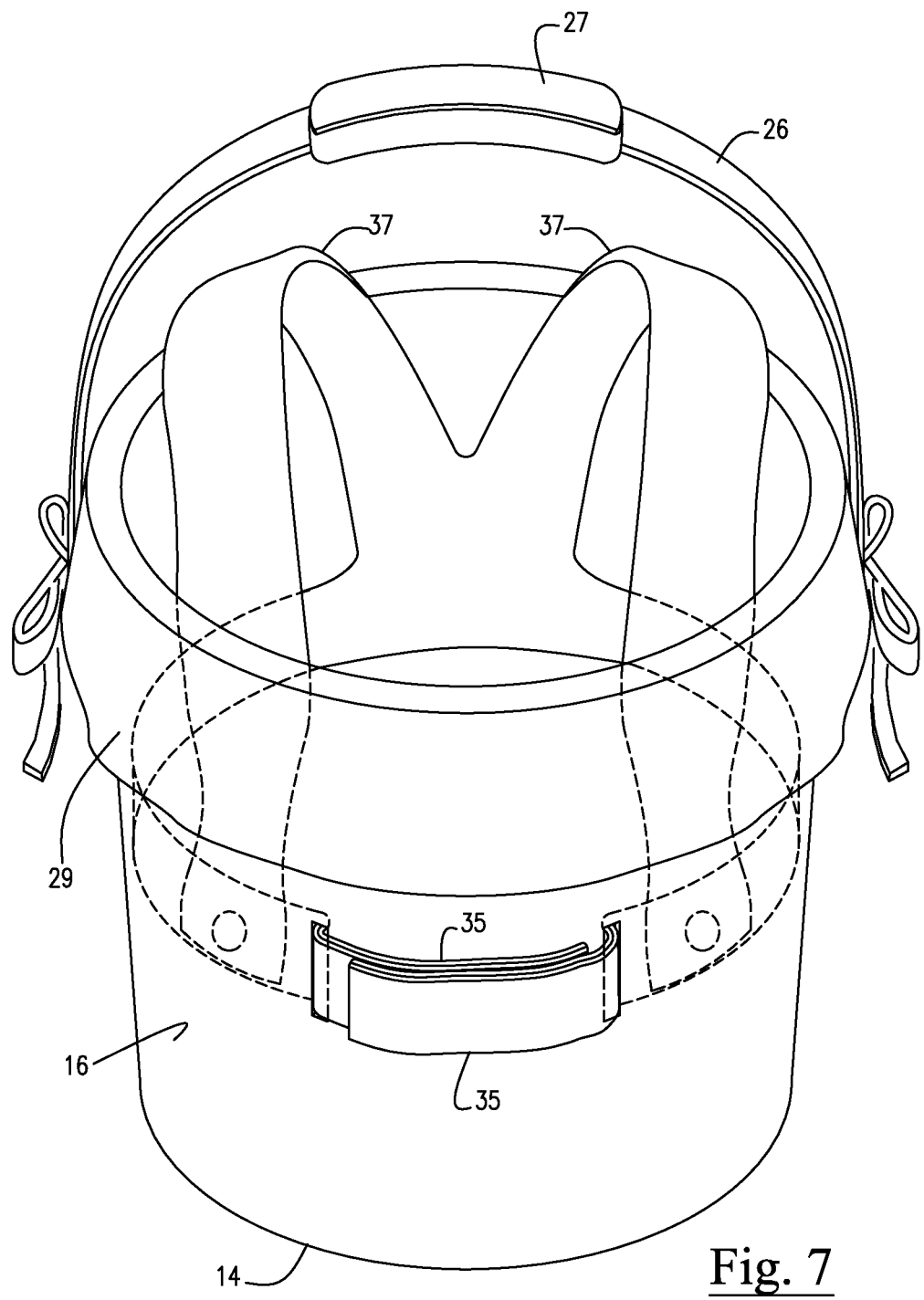
FIG. 7 is a second sequential top posterior or rear perspective view of the bucket and bucket insert assemblies showing certain straps of the harness assembly extending through posterior slots formed in the bucket insert and bucket assemblies and mated to one another for fastening the harness assembly to the bucket assembly.
Figure 8:
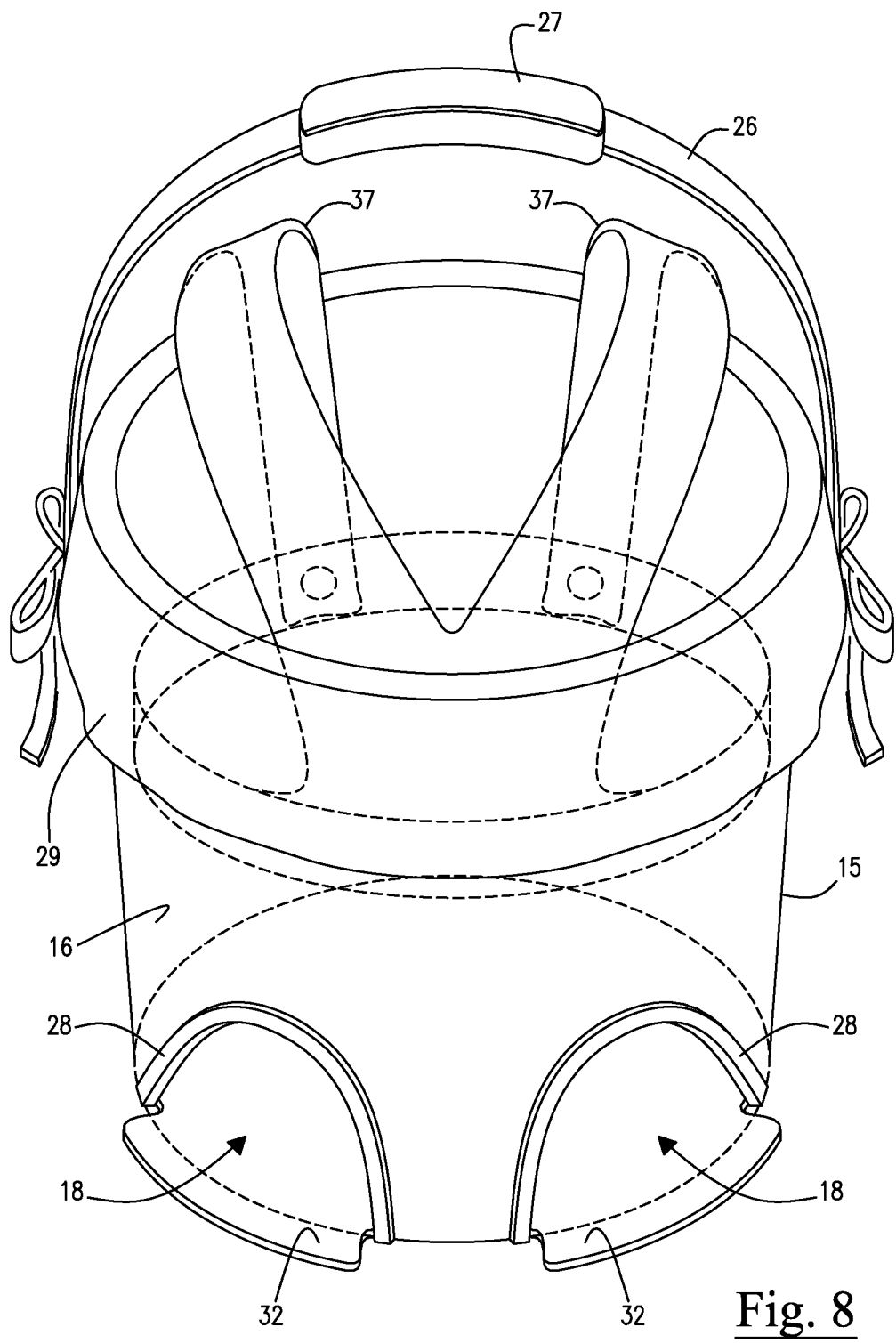
FIG. 8 is a top anterior or frontal perspective view of the bucket and bucket insert assemblies showing over-the-shoulder members of the harness assembly extending upwardly through the open top of the bucket insert and bucket assemblies and anterior leg-receiving apertures of the bucket insert and bucket assemblies.
Figure 9:
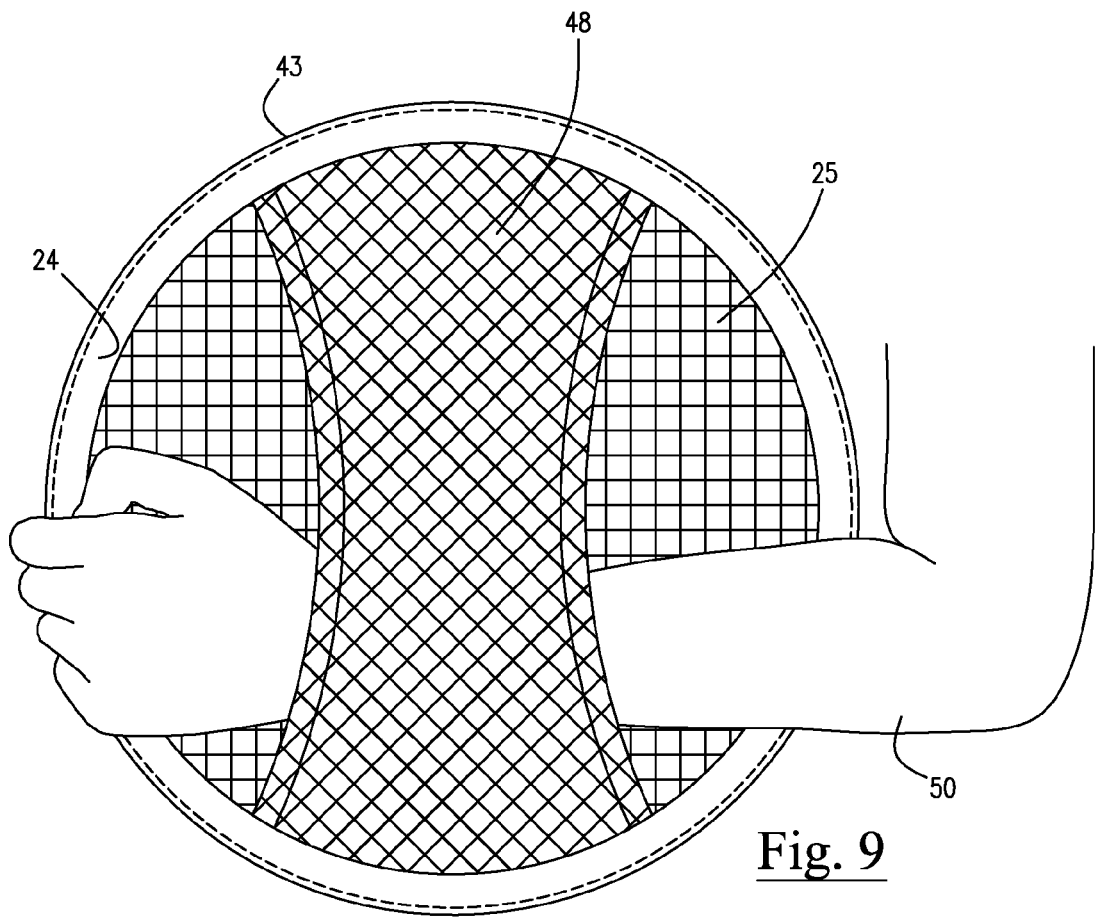
FIG. 9 is a diagrammatic depiction of a user's arm extending through two material layers of a lower ring assembly of the ring assembly according to the present invention to show how a user may carry or transport the collapsed ring assembly.

Referring now to the drawings with more specificity, the present invention essentially provides an infant transport apparatus 10 as generally depicted in FIG. 1 with all the basic components. The basic function of the infant transport apparatus 10 is to transport an infant or small child (as at 200) from one location to another. To achieve this basic function the infant transport apparatus 10 according to the present invention preferably comprises, in combination: a bucket assembly; a (bucket) insert assembly, and a bucket-support or ring assembly.

The bucket assembly according to the present invention is believed to be the primary basic component to the present invention. The bucket assembly preferably comprises a bucket construction as at 11 and a handle assembly as at 12. The bucket construction 11 preferably comprises an open bucket top as at 13, a closed bucket bottom as at 14, an apertured bucket wall as at 15, an outer bucket surface as at 16 and an inner bucket surface as at 17.

The closed bucket bottom 14 preferably has a lower outer bucket diameter as at 100. The apertured bucket wall 15 preferably comprises two bucket-based, leg-receiving apertures as at 18 adjacent the closed bucket bottom 14. The inner bucket surface 17 defines a volumetric space 105 sufficiently sized for receiving an infant or small child. The handle assembly 12 preferably comprises an open bucket top traversing member 26 and a handle portion 27.

The handle portion 27 may be preferably outfitted with a (padded) material construction that wraps around or envelopes the handle member 27, and with matable hook and loop type fastening means removably fastens the material construction to the handle member 27. The padded material construction for enveloping the handle member may preferably match the material construction of the insert assembly discussed below.

The insert assembly preferably comprises a liner assembly as at 19 and a harness assembly as at 20. The liner assembly 19 is preferably sized and shaped to fit the inner bucket surface 17. The harness assembly 20 is preferably removably and separately attachable to the bucket assembly and the liner assembly and donnable over the shoulders of an infant or small child for preventing inadvertent removal of the infant or small child from the bucket assembly when received in the volumetric space 105.

The liner assembly 19 preferably comprises a padded material construction for interfacing between the bucket-received infant or small child and the bucket assembly. In other words, the padded material construction of the liner assembly 19 shields the bucket-received infant or small child from direct contact with the inner bucket surface 17. In this regard, the reader will further please note that the two bucket-based, leg-receiving apertures 18 are preferably outfitted with aperture rim lining structures 28. The aperture rim lining structures also shield the infant's or small child's legs 201 from directly contacting the apertured bucket wall 15.

The liner assembly 19 further preferably comprises an outer bucket flap 29 that extends through the open bucket top 13 and is folded over the apertured bucket wall 15 so as to extend downwardly in circumferential adjacency to the outer bucket surface 16. The outer bucket flap comprises handle receiving slots 30 to accommodate the member open bucket top traversing member 27. The liner assembly 19 further preferably comprises liner-based leg receiving apertures as at 31. In inferior adjacency to the leg-receiving apertures 31 are two liner extensions 32 that extend through the leg-receiving apertures 18 when the liner assembly 19 is received in the bucket assembly.

The reader will further please note that the apertured bucket wall 15 preferably comprises posterior-located, opposed, bucket-based, strap-receiving slots 33 and the liner assembly 19 preferably comprises posterior-located, opposed, liner-based strap-receiving slots 34. The slots 34 align with the slots 33 when the liner assembly is inserted into the bucket assembly.

The harness assembly 20 preferably opposed harness-to-bucket fastening straps 35, which harness-to-bucket fastening straps 35 extend through the strap-receiving slots 33 and 34. The harness-to-bucket fastening straps 35 preferably comprise matable hook and look type fastening means as exemplified by VELCRO brand fastening structure(s) 36. The matable fastening means as exemplified by structure(s) 36 removably fasten the opposed harness-to-bucket fastening straps 35 thereby fastening the harness assembly 20 to the bucket construction 11.

The harness assembly 20 further preferably comprises over-the-shoulder harness members 37 that fasten to portions 38 of the straps 35, which portions 38 may be preferably outfitted with certain first fastening means as exemplified by buttons 39. In this regard, the over-the-shoulder harness members 37 are preferably outfitted with matable at least second fastening means that mate with the first fastening means as exemplified by button-receiving apertures 40. Each member 37 may further preferably comprise more than one second fastening means for enabling the user to adjust the length of the member 37 relative to the portions 38.

The ring assembly preferably comprises an upper ring assembly, an intermediate or middle ring (assembly), and a lower ring assembly. The upper ring assembly preferably comprises a first ring 21 and an apertured mesh sack 22. The first ring 21 preferably comprises a first ring diameter as at 101. The apertured mesh sack 22 is attached to the first ring 21 via a series of sack-to-ring loops or straps 41 and preferably comprises two sack-based leg receiving apertures as at 23. The lower outer bucket diameter 100 is preferably lesser than the first ring diameter 101.

Thus, the bucket assembly is preferably receivable (as at arrow 110) by the first ring 21 and supportable by the apertured mesh sack 22 such that the bucket-based apertures 18 (and liner-based apertures 31) and sack-based leg-receiving apertures 23 are aligned. The lower ring assembly preferably comprises a second ring 24 and a mesh support structure as at 25. The second ring 24 has a second ring diameter as at 102. The mesh support structure 25 basically functions to support objects (as at 104) placed thereupon. The second ring 24 may be preferably outfitted with a rubberized outer coating as at 43 for preventing damage to structures ring 24 may contact. The second ring diameter 102 is greater than the first ring diameter 101.

The ring assembly further preferably comprises a third ring assembly, which third ring assembly preferably comprises a third ring as at 42. The third or intermediate ring 42 has a third ring diameter as at 103. The third ring diameter 103 is preferably lesser than the second ring diameter 102 and greater than the first ring diameter 101. Noting the respectively varied diameters of the rings 21, 24, and 42, the reader will please note that the ring assembly is preferably collapsible as generally and comparatively depicted in FIGS. 1, 1A, 9, and 10.

Figure 10:
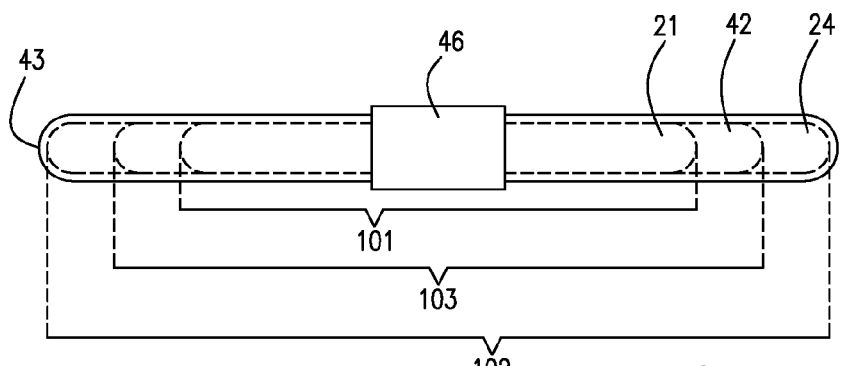
FIG. 10 is a diagrammatic edge view depiction of a collapsed ring assembly according to the present invention showing varied diameters of the various rings diametrically nested relative to one another when in a collapsed state.

In this regard, it is contemplated that each of the rings 21, 24, and 42 are connected via a series of structural members 44 that may comprise a pivot axis as at 106, which pivot axes 106 are prevented from inadvertent rotation by manually displaceable (as at 107) locking sleeves 45. To collapse the ring assembly, the locking sleeves 45 are manually displaced as at 107 thereby enabling rotation as at 106 of the members 44 so as to collapse the rings 21, 24, and 42 in a manner that is diametrically nestable for enhancing a user's ability to transport the ring assembly when the bucket assembly and insert assembly are removed therefrom. FIG. 10 depicts the ring assembly in a diametrically nested state. A locking member 46 may function to hold the ring assembly in a collapsed state.

The lower ring assembly may further preferably comprise a series of circumferentially spaced casters 47 for exemplifying certain roller means for movement. The roller means for movement are believed to enhance the transportability of the infant transport apparatus 10. Further, the lower ring assembly may further preferably comprise a second layer of material as at 48 which material layer 48 is separated from mesh support structure 25 for enabling a user to extend a user's arm 50 therethrough for carrying the collapsed ring assembly.

The bucket assembly is selectively removable from the apertured mesh sack 22 as otherwise depicted in FIG. 1 for manually transporting a bucket-contained infant or small child via the handle assembly 12. The ring assembly may then be collapsed and further carried by the user substantially as shown or diagrammatically depicted in FIG. 9.

While the foregoing specifications set forth much specificity, the same should not be construed as setting forth limits to the invention but rather as setting forth certain preferred embodiments and features. For example, as prefaced hereinabove, it is contemplated that the present invention essentially provides an infant transport apparatus for transporting an infant or small child from one location to another.

The infant transport apparatus is believed to essentially comprising a bucket assembly, which bucket assembly preferably comprises a bucket construction as at 11 and a handle assembly as at 12. The bucket construction comprises an open bucket top as at 13, an apertured bucket bottom or apertured bucket wall at the bucket bottom, and an inner bucket surface as at 17.

The apertured bucket bottom comprises two bucket-based, leg-receiving apertures, and the inner bucket surface 17 defines a volumetric space for receiving an infant or small child. The bucket assembly is thus manually transportable via the handle assembly 12, and the infant transport apparatus as exemplified by the bucket assembly in isolation may well function to transport the infant or small child as received in the volumetric space from one location to another.

The infant transport apparatus may further preferably comprise an insert assembly, which insert assembly preferably comprises a liner assembly sized and shaped to fit the inner bucket surface. The liner assembly basically functions to shield the (bucket-received) infant or small child from direct contact with the inner bucket surface.

The infant transport apparatus may further preferably comprise a harness assembly, which harness assembly is removably and separately attachable to the bucket assembly and donnable by the bucket-received infant or small child. The harness assembly basically functions to prevent inadvertent removal of the infant or small child from the bucket assembly.

The infant transport apparatus may further preferably comprise a ring assembly, which ring assembly comprises an upper ring assembly and a lower ring assembly. The upper ring assembly comprises a first ring and an apertured mesh sack or bucket support structure. The first ring comprises a first ring diameter. The apertured mesh sack is attached to the first ring and comprises two sack-based leg receiving apertures. The bucket assembly is thus receivable and supportable by the mesh sack such that the bucket-based and mesh-based leg-receiving apertures are aligned. The lower ring assembly comprises a second ring and a mesh support structure for supporting objects placed thereupon.

The ring assembly of the infant transport apparatus may preferably be collapsible such that the first and second rings are diametrically nestable for enhancing a user's ability to transport the ring assembly when the bucket assembly is removed therefrom. The lower ring assembly may further preferably comprise certain roller means for movement, which roller means for movement enhances the user's ability to transport the infant transport apparatus.

In addition to the various structural aspects of the invention, it is believed that the foregoing specifications further support certain infant transport methodological advancements or certain methods for transporting an infant or small child. Accordingly, the infant transport method supported by the apparatus according to the present invention is believed to essentially comprise the initial step of providing a bucket assembly, the bucket assembly comprising a bucket construction and a handle assembly.

The bucket construction comprises an open bucket top, an apertured bucket bottom, and an inner bucket surface. The apertured bucket bottom comprises two bucket-based, leg-receiving apertures, and the inner bucket surface defines a volumetric space for receiving an infant or small child.

The infant transport method may be further said to comprise the steps of inserting a select infant or small child into the volumetric space; extending the select infant's or small child's legs through the bucket-based leg-receiving apertures; and transporting the select infant or small child as received with the volumetric space via the handle assembly.

The infant transport method may be said to comprise the further steps of outfitting the bucket assembly with an insert assembly before inserting the select infant or small child into the volumetric space. The insert assembly may preferably comprise a liner assembly sized and shaped to fit the inner bucket surface, which liner assembly shields the select infant or small child from direct contact with the inner bucket surface during transport.

The infant transport method may be said to preferably comprise the step of donning a harness assembly upon the select infant or small child, the harness assembly being removably attached to the bucket assembly for preventing inadvertent removal of the infant or small child from the bucket assembly during transport.

The infant transport method may be said to preferably comprise the step of providing a bucket-support assembly as exemplified by the ring assembly substantially as described hereinabove. It will be recalled that the bucket support assembly preferably comprises an upper ring assembly, which upper ring assembly comprises a first ring and certain apertured means for receiving and supporting the bucket assembly, which apertured means are cooperable with the leg-receiving apertures formed in the bucket assembly, which is received and supported by the apertured means.

The infant transport method may be said to preferably further comprise the steps of removing the bucket assembly from the bucket support assembly; and collapsing the bucket support assembly. Further, the infant transport method of claim may well embrace a bucket support assembly comprising certain roller means for movement, which roller means for movement enhance the transportability of the bucket support assembly with or without the bucket assembly supported thereby.

Accordingly, although the invention has been described by reference to certain preferred embodiments and certain methodologies, it is not intended that the novel arrangement and methods be limited thereby, but that modifications thereof are intended to be included as falling within the broad scope and spirit of the foregoing disclosures and the appended drawings.

I claim:

1. An infant transport apparatus, the infant transport apparatus for transporting an infant or small child, the infant transport apparatus comprising, in combination:
 a bucket assembly, the bucket assembly comprising a bucket construction and a handle assembly, the bucket construction comprising an open bucket top, a closed bucket bottom, an apertured bucket wall, and an inner bucket surface, the closed bucket bottom having a lower outer bucket diameter, the apertured bucket wall comprising two bucket-based, leg-receiving apertures adjacent the bucket bottom, the inner bucket surface defining a volumetric space for receiving an infant or small child;
 an insert assembly, the insert assembly comprising a liner assembly and a harness assembly, the liner assembly being sized and shaped to fit the inner bucket surface, the harness assembly being removably attachable to the bucket assembly and donnable by the infant or small child, the donnable harness assembly for preventing inadvertent removal of the infant or small child from the bucket assembly; and
 a ring assembly, the ring assembly comprising an upper ring assembly and a lower ring assembly, the upper ring assembly comprising a first ring and an apertured mesh sack, the first ring comprising a first ring diameter, the apertured mesh sack being attached to the first ring and comprising two sack-based leg-receiving apertures, the lower outer bucket diameter being lesser than the first ring diameter, the bucket assembly being received and supported by the apertured mesh sack such that the bucket-based and mesh-based leg-receiving apertures are aligned, the lower ring assembly comprising a second ring and a mesh support structure, the second ring having a second ring diameter, the mesh support structure for supporting objects placed thereupon, the second ring diameter being greater than the first ring diameter, the bucket assembly being selectively removable from the apertured mesh sack for manually transportation thereof.

2. The infant transport apparatus of claim 1 wherein the ring assembly comprises a third ring assembly, the third ring assembly comprising a third ring, the third ring having a third ring diameter, the third ring diameter being lesser than the second ring diameter and greater than the first ring diameter.

3. The infant transport apparatus of claim 2 wherein the ring assembly is collapsible, the first, second, and third rings being diametrically nestable for enhancing a user's ability to transport the ring assembly when the bucket assembly and insert assembly are removed therefrom.

4. The infant transport apparatus of claim 1 wherein the lower ring assembly comprises roller means for movement, the roller means for movement for enhancing the transportability of the infant transport apparatus.

5. The infant transport apparatus of claim 1 wherein the apertured bucket wall comprises opposed bucket-based strap-receiving slots and the harness assembly comprises opposed harness-to-bucket fastening straps, the harness-to-bucket fastening straps being extended through the strap-receiving slots, the harness-to-bucket fastening straps comprising matable fastening means, the matable fastening means for fastening the opposed harness-to-bucket fastening straps thereby fastening the harness assembly to the bucket assembly.

6. The infant transport apparatus of claim 1 wherein the bucket-based, leg-receiving apertures each comprise aperture rim lining structure, the aperture rim lining structures for shielding the infant's or small child's legs from directly contacting the apertured bucket wall.

7. An infant transport apparatus, the infant transport apparatus for transporting an infant or small child, the infant transport apparatus comprising: a bucket assembly and a ring assembly, the bucket assembly comprising a bucket construction and a handle assembly, the bucket construction comprising an open bucket top, an apertured bucket bottom, and an inner bucket surface, the apertured bucket bottom comprising two bucket-based, leg-receiving apertures, the inner bucket surface defining a volumetric space for receiving an infant or small child, the bucket assembly being manually transportable via the handle assembly, the ring assembly comprising an upper ring assembly, the upper ring assembly comprising a first ring and an apertured mesh sack, the first ring comprising a first ring diameter, the apertured mesh sack being attached to the first ring and comprising two sack-based leg-receiving apertures, the bucket assembly being receivable and supportable by the apertured mesh sack such that the bucket-based and sack-based leg-receiving apertures are aligned, the infant transport apparatus for transporting the infant or small child as received in the volumetric space.

8. The infant transport apparatus of claim 7 comprising a bucket insert assembly, the bucket insert assembly comprising a liner assembly, the liner assembly being sized and shaped to fit the inner bucket surface, the liner assembly for shielding the infant or small child from direct contact with the inner bucket surface.

9. The infant transport apparatus of claim 7 comprising a harness assembly, the harness assembly being removably attachable to the bucket assembly and donnable by the infant or small child, the donnable harness assembly for preventing inadvertent removal of the infant or small child from the bucket assembly.

10. The infant transport apparatus of claim 9 wherein the apertured bucket wall comprises strap-receiving slots and the harness assembly comprises harness-to-bucket fastening straps, the harness-to-bucket fastening straps being extended through the strap-receiving slots, the harness-to-bucket fastening straps comprising matable fastening means, the matable fastening means for fastening the harness-to-bucket fastening straps thereby fastening the harness assembly to the bucket assembly.

11. The infant transport apparatus of claim 7 wherein the ring assembly is collapsible for enhancing a user's ability to transport the ring assembly when the bucket assembly is removed therefrom.

12. The infant transport apparatus of claim 7 wherein the ring assembly comprises roller means for movement, the roller means for movement for enhancing the transportability of the infant transport apparatus.

13. The infant transport apparatus of claim 7 wherein the bucket-based, leg-receiving apertures each comprise aperture rim-lining structure, the aperture rim-lining structure for shielding the infant or small child from directly contacting the apertured bucket wall.

14. An infant transport method for transporting an infant or small child, the infant transport method comprising the steps of:
  providing a bucket assembly, the bucket assembly comprising a bucket construction and a handle assembly, the bucket construction comprising an open bucket top, an apertured bucket bottom, and an inner bucket surface, the apertured bucket bottom comprising two bucket-based, leg-receiving apertures, the inner bucket surface defining a volumetric space for receiving an infant or small child;
  providing a bucket-support assembly, the bucket-support assembly comprising an upper ring assembly, the upper ring assembly comprising a first ring and apertured means for receiving and supporting the bucket assembly, the bucket assembly being received and supported by the apertured means;
  inserting a select infant or small child into the volumetric space;
  extending the select infant's or small child's legs through the bucket-based leg-receiving apertures; and
  transporting the select infant or small child as received with the volumetric space.

15. The infant transport method of claim 14 comprising the step of outfitting the bucket assembly with an insert assembly before inserting the select infant or small child into the volumetric space, the insert assembly comprising a liner assembly, the liner assembly being sized and shaped to fit the inner bucket surface, the liner assembly for shielding the select infant or small child from direct contact with the inner bucket surface during transport.

16. The infant transport method of claim 14 comprising the step of outfitting the select infant or small child with a harness assembly, the harness assembly being removably attachable to the bucket assembly, the harness assembly for preventing inadvertent removal of the infant or small child from the bucket assembly during transport.

17. The infant transport method of claim 14 comprising the steps of:
  removing the bucket assembly from the bucket-support assembly; and
  collapsing the bucket support assembly.

18. The infant transport method of claim 14 wherein the bucket-support assembly comprises roller means for movement, the roller means for movement for enhancing the transportability of the bucket-support assembly.

\* \* \* \* \*